(12) United States Patent
Lane

(10) Patent No.: US 10,586,137 B2
(45) Date of Patent: Mar. 10, 2020

(54) PRODUCT DIVERSION MANAGEMENT

(71) Applicant: Alumier Europe Limited, Valletta VLT (MT)

(72) Inventor: Sanford Lane, Sherborn, MA (US)

(73) Assignee: Alumier Europe Limited, Valletta (MT)

( * ) Notice: Subject to any disclaimer, the term of this patent is extended or adjusted under 35 U.S.C. 154(b) by 0 days.

(21) Appl. No.: 15/557,534

(22) PCT Filed: Mar. 11, 2016

(86) PCT No.: PCT/IB2016/000376
§ 371 (c)(1),
(2) Date: Sep. 12, 2017

(87) PCT Pub. No.: WO2016/142777
PCT Pub. Date: Sep. 15, 2015

(65) Prior Publication Data
US 2018/0053078 A1 Feb. 22, 2018

Related U.S. Application Data

(60) Provisional application No. 62/132,444, filed on Mar. 12, 2015.

(51) Int. Cl.
*G06K 19/06* (2006.01)
*G06Q 10/08* (2012.01)
(Continued)

(52) U.S. Cl.
CPC ....... *G06K 19/06037* (2013.01); *G06K 1/121* (2013.01); *G06Q 10/08* (2013.01);
(Continued)

(58) Field of Classification Search
CPC ... G06K 19/06037; G06K 7/14; G06K 7/1417
(Continued)

(56) References Cited

U.S. PATENT DOCUMENTS 5,979,756 A * 11/1999 Ahn .................. H01L 21/67326
235/383
6,098,892 A * 8/2000 Peoples, Jr. .............. G06K 7/14
235/494

(Continued)

FOREIGN PATENT DOCUMENTS

EP          0971304         5/2002
WO         2014095740      6/2014

*Primary Examiner* — Ahshik Kim
(74) *Attorney, Agent, or Firm* — Occhiuti & Rohlicek LLP

(57) ABSTRACT

The present invention features compositions and methods useful in detecting counterfeit products and product diversion. The methods include packaging and indelibly marking products through an opening in their container and/or through a wall of the container that includes a hole therein. Unique identifiers are placed on the product and the container. In other methods, the product is not packaged within a container but is indelibly marked with first and second representations of a unique identifier, either or both of which can be machine-readable, human-readable, and/or at least partially randomized. An apparatus for carrying out the methods of product marking is also disclosed.

23 Claims, 7 Drawing Sheets

(51) Int. Cl.
  *G06Q 50/04* (2012.01)
  *G06Q 50/28* (2012.01)
  *G06K 1/12* (2006.01)

(52) U.S. Cl.
  CPC .......... *G06Q 10/087* (2013.01); *G06Q 50/04* (2013.01); *G06Q 50/28* (2013.01); *Y02P 90/30* (2015.11)

(58) Field of Classification Search
  USPC ....................................................... 235/494
  See application file for complete search history.

(56) References Cited

U.S. PATENT DOCUMENTS

| | | |
|---|---|---|
| 6,419,782 B1 | 7/2002 | Johnson et al. |
| 6,776,340 B2* | 8/2004 | Murokh ............... B41J 2/17566 235/454 |
| 2003/0024913 A1 | 2/2003 | Downes et al. |
| 2003/0141358 A1 | 7/2003 | Hudson et al. |
| 2005/0139663 A1* | 6/2005 | Hopwood .............. G06Q 10/08 235/385 |
| 2007/0199988 A1 | 8/2007 | Labgold et al. |
| 2010/0006648 A1 | 1/2010 | Grant et al. |
| 2010/0252626 A1* | 10/2010 | Elizondo ............. G06Q 10/087 235/385 |
| 2013/0105568 A1* | 5/2013 | Jablonski ............ G06F 19/3456 235/375 |
| 2013/0257594 A1 | 10/2013 | Collins |

* cited by examiner

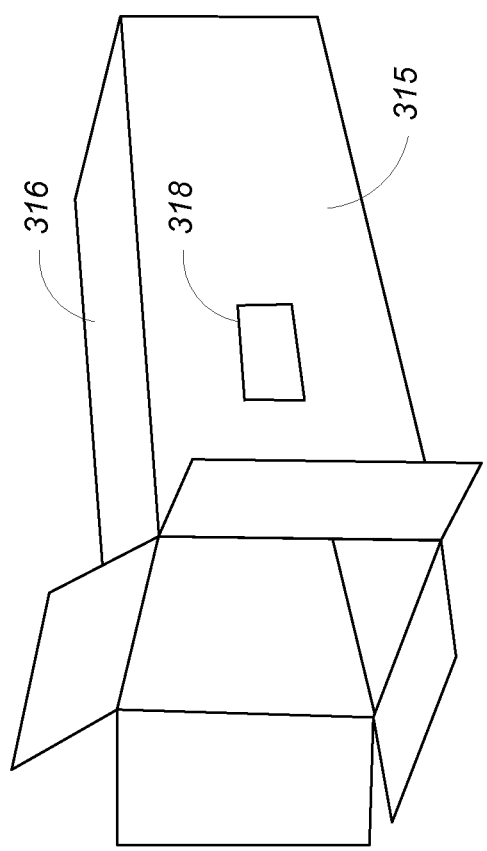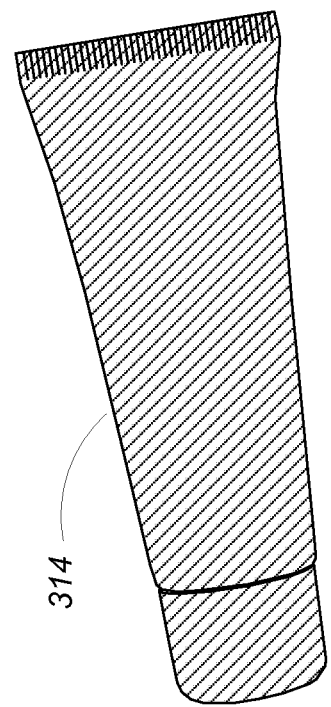
FIG. 3

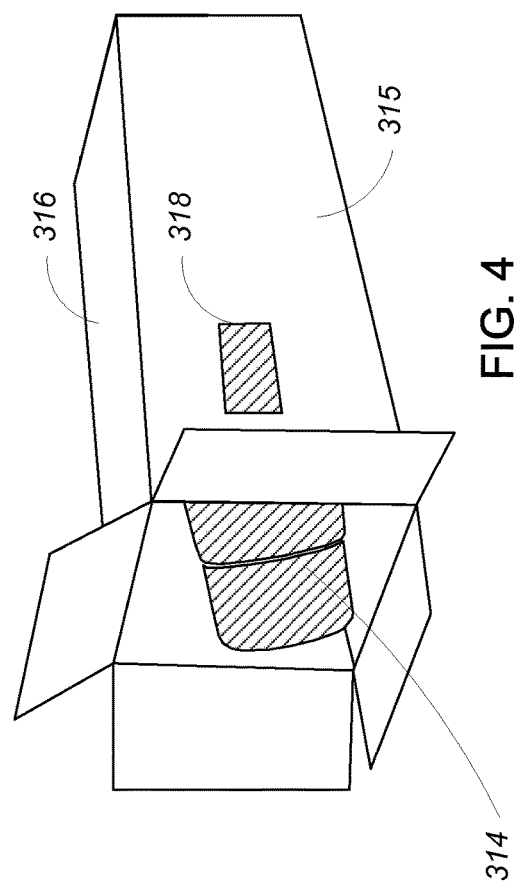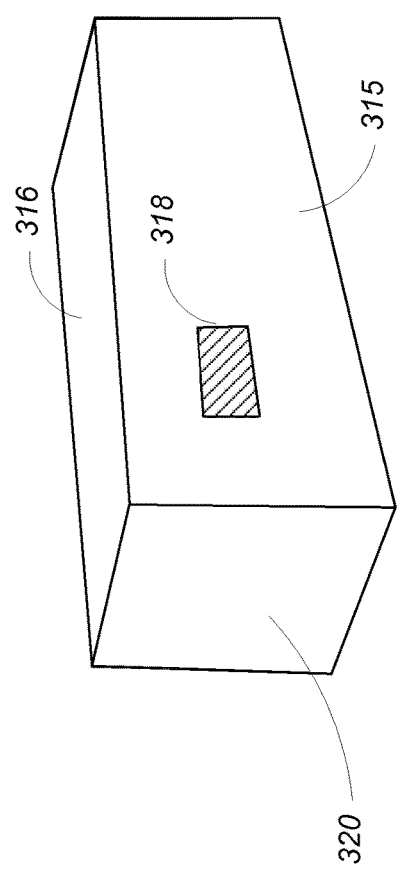

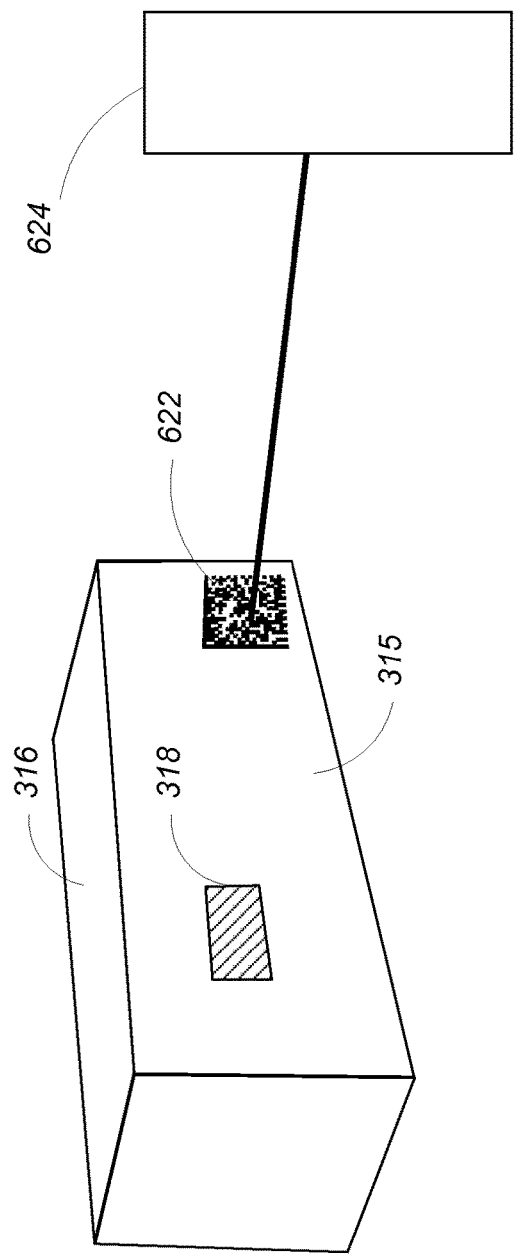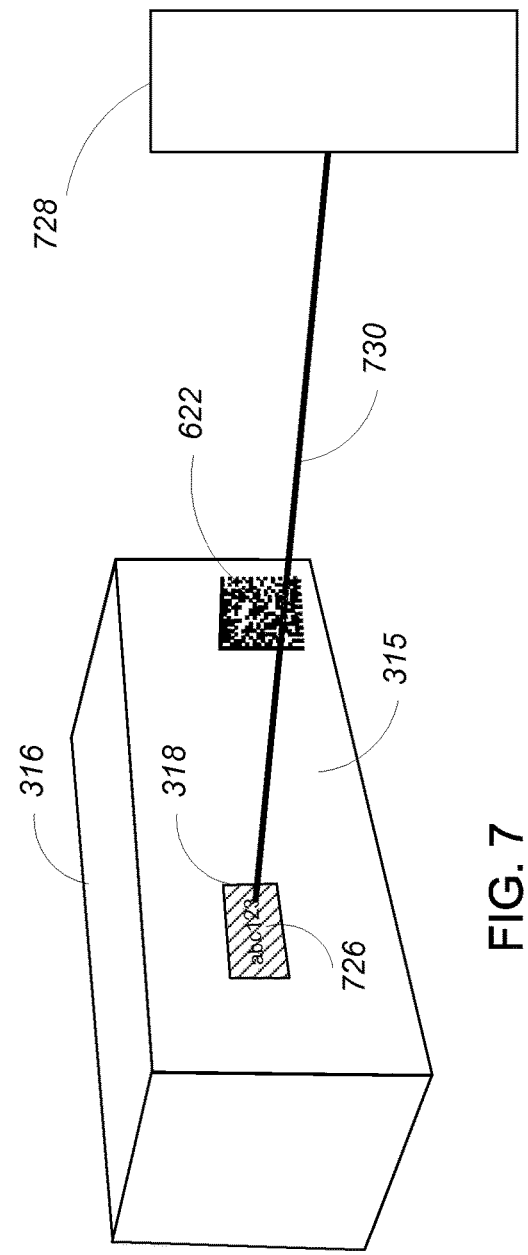

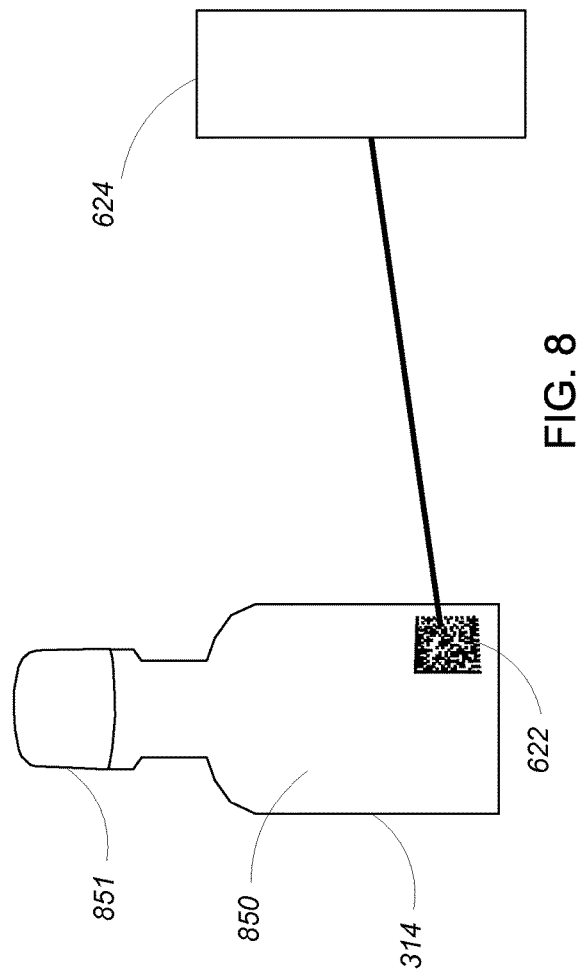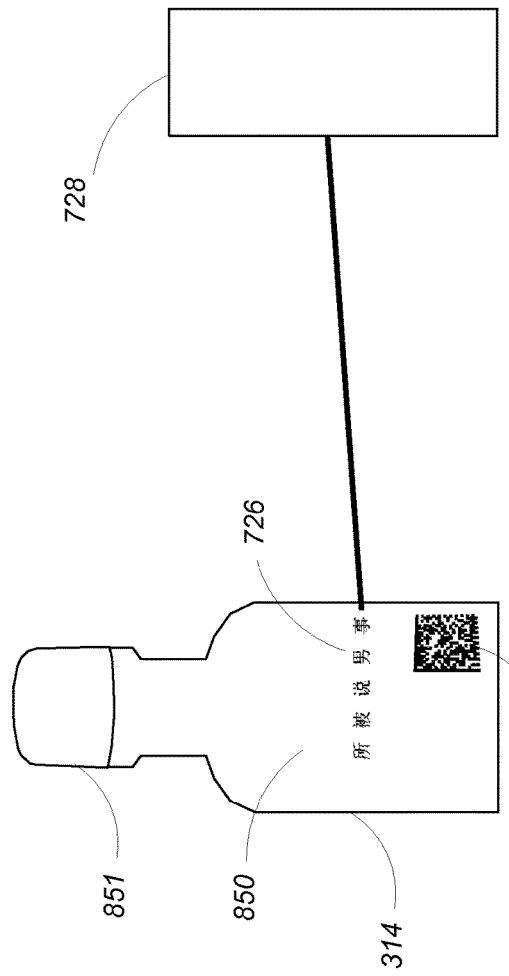

PRODUCT DIVERSION MANAGEMENT

CROSS-REFERENCE TO RELATED APPLICATIONS

This application is a U.S. National Stage Application of International Application No. PCT/IB2016/000376, filed on Mar. 11, 2016, which claims the benefit of the filing date of U.S. Provisional Application No. 62/132,444, filed Mar. 12, 2015. The entire content of each of the above-referenced applications is incorporated herein by reference in its entirety.

FIELD OF THE INVENTION

This invention relates to methods and machinery for marking and tracking commercial products in a manner that facilitates, inter alia, detecting and managing product diversion and counterfeiting.

BACKGROUND OF THE INVENTION

In commerce, companies strive to control the movement and pricing of their products as those products move through the distribution chain to a consumer. These important controls are threatened by counterfeiting, which brings substandard products to the consumer, and diversion, which brings genuine products to consumers prematurely through an unauthorized seller. Short-circuiting the planned distribution channels allows a diverter or counterfeiter to undercut the manufacturer's controlled customer-pricing model while taking unfair advantage of the true owner's marketing and sales efforts. The negative impact on product image, pricing, and profitability can be significant. In some instances, product diversion can damage a branded product so severely that it destroys the market potential of the product over time. The devious practices of counterfeiting and product diversion have been aided by the internet and e-commerce, and there remains a need for products and processes to detect and discourage them.

SUMMARY OF THE INVENTION

In one aspect, the invention features methods of packaging and/or indelibly marking a product that include the steps of inserting the product into a container (e.g., a box or bag) having an opening and/or a wall (or other retaining element of like function) including a hole therein and indelibly marking the product within the container with a first representation of a unique identifier and indelibly marking an inner or outer surface of the container with a second representation of the unique identifier. The opening of the container can be an end, side, or other portion of the container (e.g., a portion from which one or more flaps extend); when the opening is closed (e.g., when the flaps are folded over the opening and secured), the container is closed. Where an inner surface of the container is marked, that surface may be one that is readily exposed during the marking process (e.g., a surface of a flap that, when closed, comes to reside on the inside of the container). The marking can be indelible, which is beneficial in that such markings remain associated with the products over their expected lifetimes under the usual conditions of manufacture, transport, sale, and use. For example, an indelible mark is one that cannot be removed without damaging the underlying product or container.

Various embodiments of the method may include one or more of the following features.

The method may include securing or capturing the product within the container after indelibly marking the product through the opening in the container. The method may include securing the product within the container before or after indelibly marking the product by directing the first representation to the product through the hole in the wall of the container. Where the product is secured within the container it is attached to the container, and where the product is captured by the container it is wholly or partially enveloped by the container.

Indelibly marking the product and a surface (e.g., an inner or outer surface) of the container may include one or more of printing, laser engraving, etching, stamping, embossing, or dyeing the first and second representations of the unique identifier on the product and on an outer surface of the container. The first representation and/or the second representation of the unique identifier may include a machine-readable code and/or a human-readable code. The machine-readable code may include a two-dimensional code or a three-dimensional code (e.g., Braille or a Braille-like code). The human-readable code may include an alphanumeric code and/or a symbolic code. At least a portion of the code (e.g., the human-readable code) may be randomized and/or may include a manufacturer identifier.

The methods may include storing an association of an invoice number (or other document item that is uniquely associated with a given product) and one or more of the unique identifiers in a database. The method may include forming the hole in a retaining element (e.g., a wall) of the container (e.g., by a die cutting process). In any of the embodiments involving a stored association, that association may reference either an invoice number or a number or other identifier on another type of document (i.e., the association may be with, but is not necessarily with, a document that includes billing, inventory, marketing, product cost information, or other product literature (e.g., safety and use information)).

In any embodiment, the stored association can associate an invoice number (or other document item) with one or both of the unique identifiers and also with a representation of a plurality of the products (e.g., a lot number) or some other characteristic shared by a plurality of the products. For example, a representation may be made assigned to products that include a material of a certain grade (e.g., grade A or organic material) or from a certain source (e.g., a certain laboratory). The representations of these shared characteristics (shared lot, shared source, etc. . . . ) can be separate from the first and second representations of the unique identifiers or may be included in either or both of those representations. For example, any representation can be configured to include numerous pieces of information regarding a given product. For example, a representation having a plurality of fields (e.g., 3-30 fields) can include information that, when decoded, specifies a unique product identifier, a SKU (stock keeping unit), and a lot code. For example, in a representation having 15 fields, the first six can represent the unique product identifier, the seventh through eleventh can represent the SKU, and the twelfth through fifteenth can represent the lot code.

In another aspect, the invention features an apparatus that automates a process of product marking as described herein. For example, the invention features an apparatus having a moving component such as a conveyor belt. The belt can have a length, and the apparatus can include a first marking device configured to indelibly mark a product on the conveyor belt with a first representation of a unique identifier, a second marking device configured to indelibly mark the product or an outer surface of a container containing the product on the conveyor belt with a second representation of the unique identifier, and a controller for causing the first marking device to mark the product and the second marking device to mark the product or the outer surface of the container when the product and/or the container reach a specified position or positions along the length of the conveyor belt. In other embodiments, the apparatus could be configured to capture and place a product within the path of a marking device.

In various embodiments, an apparatus of the invention may include one or more of the following features.

The first marking device may be configured to mark the product while the product is within the container. The first marking device and/or the second marking device may include a printing device, an etching device, a stamping device, an embossing device, a dyeing device, and/or a laser engraving device. In some embodiments, the first marking device and the second marking device can be the same device (i.e., a single device can carry out both the product marking and container marking; a single device can mark the product with the first representation and mark the container with the second representation). The apparatus may include a computing device in communication with a database, and the computing device can be configured to store an association between the unique identifier and an invoice number in the database. The apparatus may include a first sensor for detecting when the container and/or the product has reached a first position along the length of the conveyor belt and a second sensor for detecting when the container and/or the product has reached a second position along the length of the conveyor belt. In some embodiments, the first sensor and the second sensor can be the same sensor (i.e., a single sensor can detect the container and the product). In some embodiments, the apparatus is configured to mark cosmetic or personal care items (e.g., the conveyor belt or apparatus that transfers the product to a target location for labeling can be one that is unable to bear the weight of products weighing more than about one pound).

The first representation of the unique identifier may include a machine-readable code and/or a human-readable code. The second representation of the unique identifier may include a machine-readable code and/or a human-readable code. The machine-readable code may include a two-dimensional code and/or a three-dimensional code. The human-readable code may include an alphanumeric code and/or a symbolic code. A portion of the code (e.g., the human-readable code) may be randomized and/or may include a manufacturer identifier.

In another aspect, the invention features methods of product diversion and counterfeiting management that include indelibly marking the product with a representation of a unique identifier, and storing an association of the product, the unique identifier, and supply chain tracking information for the product in a database.

In various embodiments, these methods may include one or more of the following features.

The method may further include, upon receiving the product at a supply chain entity of a supply chain, updating the supply chain tracking information for the product in the database to indicate that the product was received by the supply chain entity.

In another general aspect, a method for product diversion and counterfeiting management includes receiving a representation of a unique identifier associated with a product, querying a database including a plurality of associations between unique identifiers, invoice numbers, and supply chain tracking information to determine whether the unique identifier is represented in the database, providing an indication that the product is a counterfeit product if the unique identifier is not represented in the database, and providing an indication that the product is an authentic product and an indication of a supply chain entity that most recently received the product if the unique identifier is represented in the database, including determining the indication of the supply chain entity that most recently received the product based on the supply chain tracking information associated with the unique identifier.

In another aspect, the invention features software embodied on a non-transitory, computer-readable medium that includes instructions for causing a processing element to implement a method for product diversion and counterfeiting management. The method includes receiving a representation of a unique identifier associated with a product, querying a database including a plurality of associations between unique identifiers, invoice numbers, and supply chain tracking information to determine whether the unique identifier is represented in the database, providing an indication that the product is a counterfeit product if the unique identifier is not represented in the database, providing an indication that the product is an authentic product and an indication of a supply chain entity that most recently received the product if the unique identifier is represented in the database, including determining the indication of the supply chain entity that most recently received the product based on the supply chain tracking information associated with the unique identifier.

Various aspects and embodiments of the present invention may include one or more of the following advantages. The machinery and methods described herein allow one to not only mark products individually, but also to mark each container in which a given product is placed. By marking the product while it is already inside of the container (whether yet sealed or secured or not), the likelihood of having a mismatch between the marking on the product and a corresponding mark on the container is minimized, and each marking can correspond to a different unique identifier. Using a laser engraving device to mark the product is advantageous since a laser engraved mark is more difficult to remove than, for example, a printed mark. Marking the product with a human readable (e.g., an alphanumeric or symbolic) identifier allows for a human to read the identifier such that they can easily provide the identifier to a diversion and counterfeiting avoidance system (e.g., via a computer application). By using a randomized unique identifier, problems associated with the predictability of sequential or patterned unique identifiers can be averted.

Other features and advantages of the invention are apparent from the following description, and from the claims.

BRIEF DESCRIPTION OF THE DRAWINGS

FIG. 3 is a product before it is inserted into its container.

FIG. 4 is a product inserted into its container.

FIG. 5 is a product inserted into its container with the container closed and sealed.

FIG. 6 shows a first representation of a unique identifier being printed onto a container.

FIG. 7 shows a second representation of a unique identifier being engraved onto a product.

FIG. 8 shows a first representation of a unique identifier being printed onto a product.

FIG. 9 shows a second representation of the unique identifier being printed onto the product of FIG. 8.

DETAILED DESCRIPTION

Product Diversion

Figure 1:
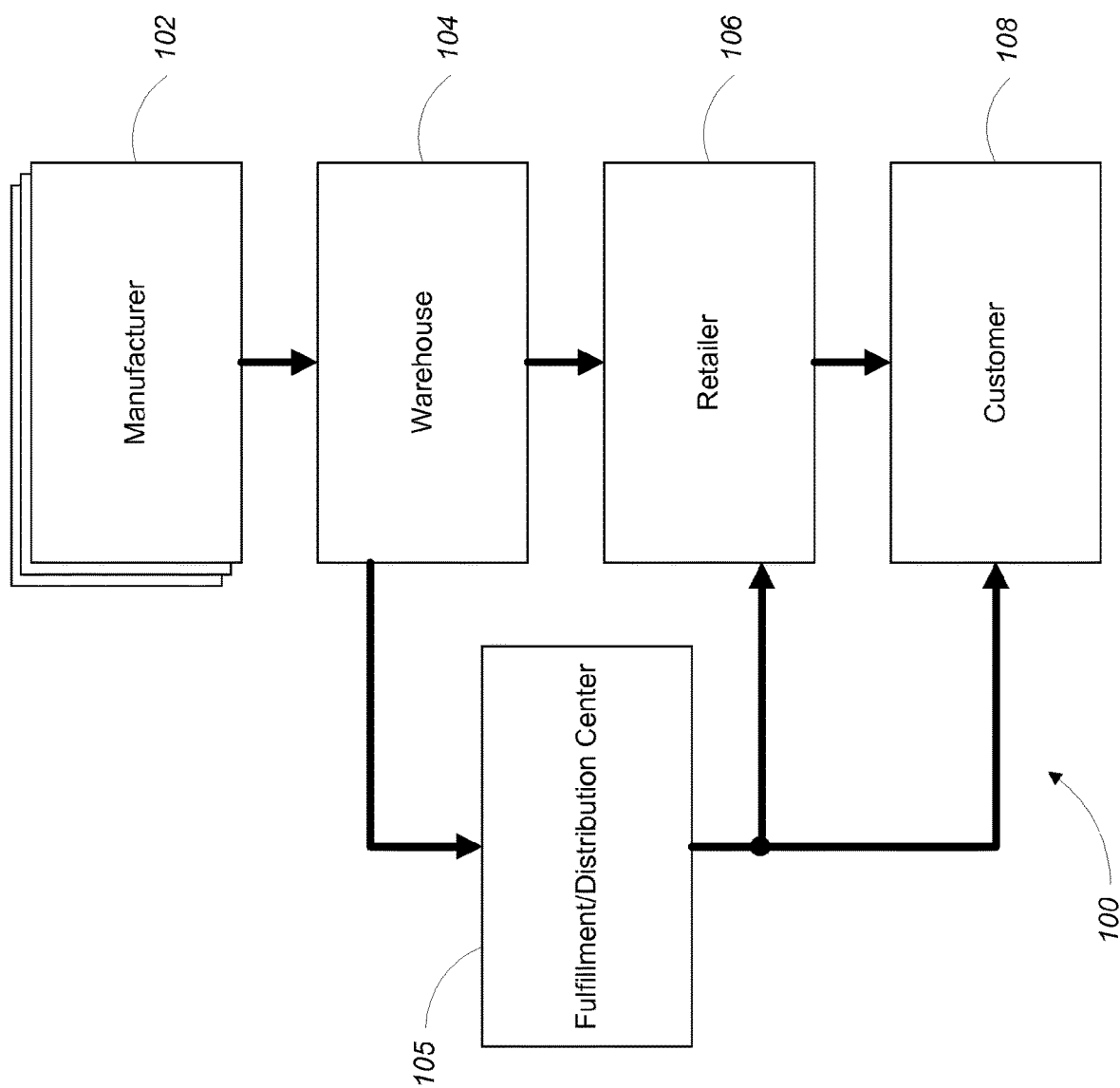
FIG. 1 is a product distribution channel.

FIG. 1 illustrates an example of a product distribution system 100 for a product that includes one or more manufacturers 102, a fulfillment/distribution center 105, a warehouse 104, an authorized retailer 106, and a customer 108. In a scenario where no product diversion occurs, the manufacturer(s) 102 manufacture the product and ship the product to the warehouse 104. The warehouse 104 ships the products to the fulfillment/distribution center 105 and/or the retailer 106.

In the case that the warehouse 104 ships the product to the fulfillment/distribution center 105, the fulfillment/distribution center 102 supplies the product to the customer 108 and/or the retailer 106. In the case that the warehouse 104 ships the product to the retailer 106, the retailer 106 sells the product to the customer 108.

Figure 2:
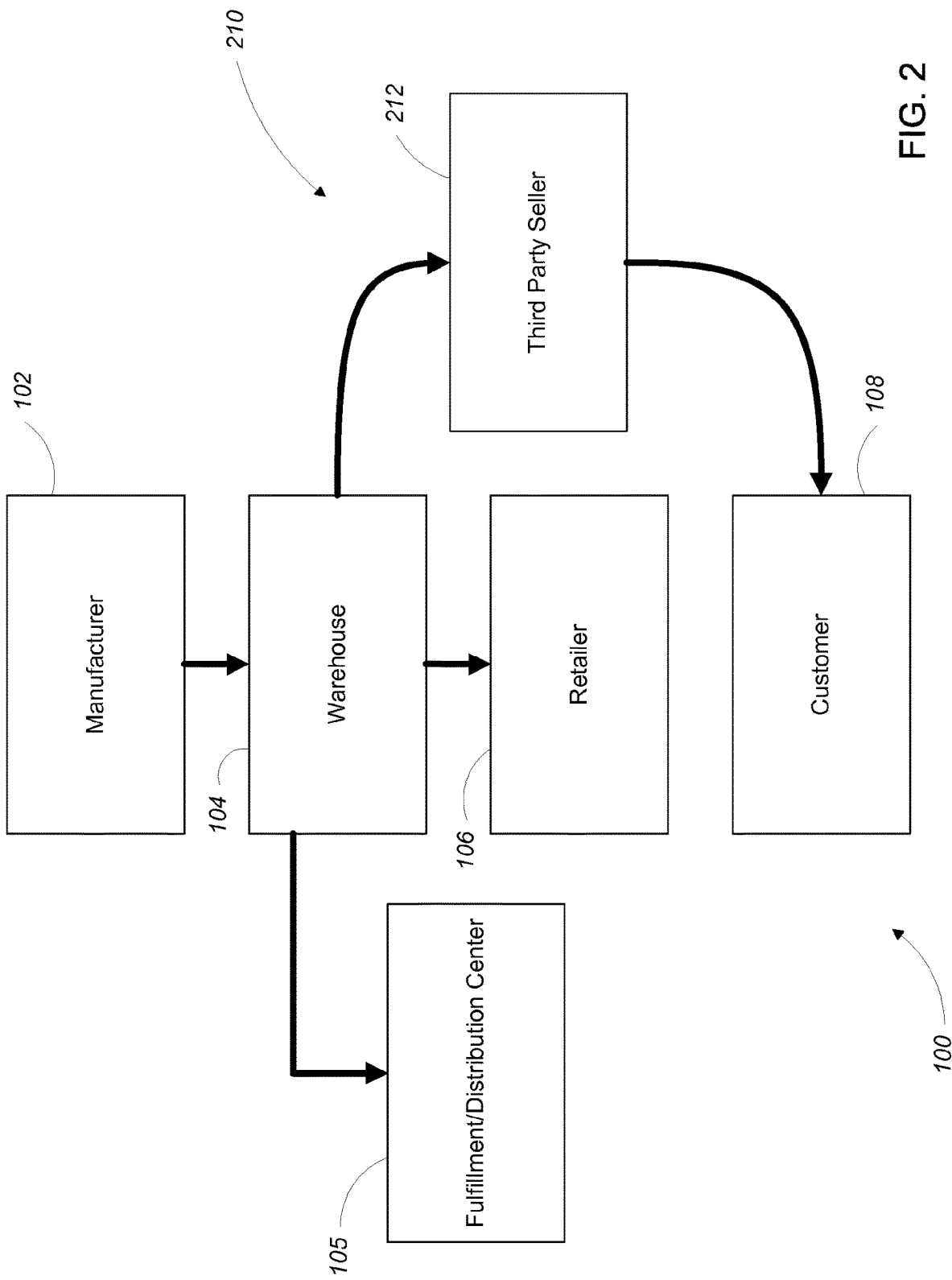
FIG. 2 is a product distribution channel with a product diversion channel.

FIG. 2 illustrates one example of a product diversion channel 210. The product diversion channel 210 is established in this example when the warehouse 104 sells the product to a third party seller 212 (e.g., an unauthorized internet retailer such as a web seller or an e-commerce site; the third party seller may also have obtained the product by theft from any point or any point of transfer in the distribution system). The third party seller then sells the product to the customer 108, bypassing the authorized retailer 106 and/or the fulfillment/distribution center 105 in the process. In some instances, a disreputable warehouse may divert the product by selling it directly to customers. In either event, the product is likely to be sold at a lower price than that offered by the authorized retailer 106 or the fulfillment/distribution center 105. As a result, product diversion, as illustrated by the product diversion channel 210, adversely affects the retailer's ability to price and sell the product with the expected profit margin. This can, in turn, harm the warehouse and manufacturer and upstream suppliers. In addition, the reputation of the product can be adversely affected if the third party seller 212 or a disreputable warehouse sells damaged or expired units of the product to customers. In other circumstances, the third party seller or any unauthorized seller can also seek to profit by removing a product from its container and replacing it with a counterfeit version. The original, authentic product could, additionally, be sold separately (i.e., without its original packaging).

In general, product diversion channels are possible at any stage in the product distribution system 100. For example, the retailer 106 may buy an excess of product from the warehouse 104 and sell the excess product to the customer 108 via a third party seller 212 or another alternative channel. Another possible product diversion channel involves an employee at the manufacturer 102, the warehouse 104, or the fulfillment/distribution center 105 stealing product and selling the stolen product to the customer 108 (e.g., by advertising the product on line or on an unauthorized website) or the retailer 106.

Product Diversion Avoidance

In some examples, to detect and mitigate product diversion channels, the invention features specialized product marking schemes that include marking the product and/or a container that holds the product with one or more representations of a unique identifier. When the product is shipped from the manufacturer 102, the unique identifier is associated with an invoice number (e.g., by scanning the representation of the unique identifier with a hand-held scanner) and stored in a database. The marked product is then tracked through the distribution channel. An entity within the channel would record receipt of the product as well as shipment of the product to the next entity in the distribution channel (e.g., by scanning the representation of the unique identifier with a hand-held scanner). For example, each entity could read the unique identifier, as discussed further below. When diversion or counterfeiting is suspected, the product can be examined/scanned again to determine which entity in the distribution chain was the last to receive it.

Through-Container Product Marking

Referring to FIG. 3, a product 314 and a container 316 are shown, with the product 314 not yet inserted into the container 316. The container 316 includes a hole 318 in one of its walls. In some embodiments, the hole 318 is die cut in the wall of the container 316 prior to the container 316 being assembled. Very generally, the through-container product marking scheme involves indelibly marking both an outer surface 315 of the container 316 and an outer surface of the product 314 with a representation of a unique identifier with the the product 314 already inserted into the container 316.

The outer surface 315 of the container 316 can be marked using conventional indelible marking techniques, with the particular technique being selected in view of the material from which the container is made. In one embodiment, the outer surface of the product 314 is marked through the wall of the container 316 via the hole 318. Referring to FIG. 4, in a first step, the product 314 is inserted into the container 316. Note that in FIG. 4 the product is clearly visible through the wall of the container 316 via the opening 318. The exact size, shape, and placement of the hole can vary. Referring to FIG. 5, in a second step, an open end 320 of the container 316 is closed, securing the product 314 in the container 316. In some examples, securing the product 314 in the container 316 includes sealing (e.g., fastening a flap over the open end 320 of the container 316 using an adhesive or a tab, tuck, or pressure fit).

Referring to FIG. 6, in a third step, the outer surface 315 of the wall is indelibly marked with a first representation 622 of the unique identifier. In the example shown in FIG. 6, the first representation 622 of the unique identifier is a machine-readable two-dimensional (2D) code. In other examples, a first representation 622 of the unique identifier is a three-dimensional (3D) code, a QR code, a bar code, an alphanumeric code, or another marking code as is known in the art. In some examples, the first representation 622 of the unique identifier is printed in indelible ink onto the outer surface of the wall 315 of the container 316 using a printer 624 (e.g., an ink jet printer or a laser printer).

Referring to FIG. 7, in a fourth step, the outer surface of the product 314 is indelibly marked with a second representation 726 of the unique identifier. In FIG. 7, the second representation 726 of the unique identifier is a human-readable code (e.g., an alphanumeric code or a symbolic code). In other examples, a second representation 726 of the unique identifier is a 3D code, a 2D code, a QR code, a bar code, or another marking code as is known in the art. In some examples, the second representation 726 of the unique identifier is indelibly engraved (or etched) onto the outer surface of the product 314 using a laser engraving device 728. Note that since the product 314 is already inserted into the container 316, a laser beam 730 of the laser engraving device 728 must pass through the opening 318 in the wall of the container 316 to mark the product 314.

The product and the container in which it is placed can be marked simultaneously or sequentially in either order. As described above and illustrated in FIGS. 6 and 7, the container for the product can be marked first (with a first representation of the unique identifier) and the product can be marked subsequently (with a second representation of the unique identifier). This sequence can be reversed, with the product being marked first (with a first representation of the unique identifier) and the product's container being marked subsequently (with a second representation of the unique identifier). Thus, the first representation of the unique identifier and the second representation of the unique identifier can be marked onto the container and product in any order. Alternatively, and as noted, the product and the product's container can be marked at essentially the same time with first and second representations of the unique identifier.

As described above and illustrated in FIG. 7, the product can be marked through the opening in the wall of the container. In an alternative embodiment, the product can be placed in a container that is intact (i.e., that does not include a hole as described above) and then marked through a natural opening that will subsequently be closed (e.g., folded over and secured or closed with an adhesive or folded over and held in place by a tab, tuck, or pressure fit). For example, the product may be marked through the natural opening in the container through which it was placed. Thus, and in general, it is not required that the container be sealed in order to mark either or both of the product and the container.

In some embodiments, the container can be further manipulated by, for example, being enclosed (e.g. in cellophane) or further embellished. In some embodiments, the containers including products can be collected in a shipping container (e.g., a box or crate), and the shipping container can be further marked with a representation of a unique identifier (e.g., a different unique identifier such as a lot number that is associated or linked with all of the unique identifiers of the products and containers collected in the shipping container).

Container-Less Product Marking

Referring to FIGS. 8 and 9, in some examples, the product 314 is not placed in an additional container and an outer surface 850 of the product 314 is marked with both a first representation 622 of a unique identifier and a second representation 726 of the unique identifier.

For example, in FIG. 8, in a first step, the outer surface 850 of the product 314 is indelibly marked with the first representation 622 of the unique identifier. In the example shown in FIG. 8, the first representation 622 of the unique identifier is a machine-readable two-dimensional (2D) code. As was the case above, in other examples, the first representation 622 of the unique identifier is a 3D code, a QR code, a bar code, an alphanumeric code, or another marking code as is known in the art. In some examples, the first representation 622 of the unique identifier is printed in indelible ink onto the outer surface 850 of the product 314 using a printer 624 (e.g., an ink jet printer or a laser printer).

Referring to FIG. 9, in a second step, the outer surface 850 of the product 314 is indelibly marked with the second representation 726 of the unique identifier. In FIG. 9, the second representation 726 of the unique identifier is a human-readable code (e.g., an alphanumeric code or a symbolic code). As was the case above, in other examples, the second representation 726 of the unique identifier is a 3D code, a 2D code, a QR code, a bar code, or another marking code as is known in the art. In some examples, the second representation 726 of the unique identifier is indelibly engraved (or etched) onto the outer surface 850 of the product 314 using a laser engraving device 728.

The first and second representations 622, 726 of the unique identifier can be marked simultaneously or sequentially in either order. As described above and illustrated in FIGS. 8 and 9, the product 314 can be marked first with the first representation 622 of the unique identifier and the product 314 can be marked subsequently with the second representation 726 of the unique identifier. This sequence can be reversed, with the product 314 being marked first with the first representation 622 of the unique identifier and the product 314 container being marked subsequently with the second representation 726 of the unique identifier. Thus, the first representation 622 of the unique identifier and the second representation 726 of the unique identifier can be marked onto the product in any order. Alternatively, and as noted, the product can be marked at essentially the same time with first and second representations 622, 726 of the unique identifier.

In some embodiments, the product can be further manipulated by, for example, being enclosed (e.g. in cellophane) or further embellished. In some embodiments, the marked products can be collected in a shipping container (e.g., a box or crate), and the shipping container can be further marked with a representation of a unique identifier (e.g., a different unique identifier such as a lot number that is associated or linked with all of the unique identifiers of the products collected in the shipping container).

In some embodiments, portions of the product 314 other than the outer surface 850 are marked with one or both of the first and second representations 622, 726 of the unique identifier. For example, a cap 851 of the product 314 may be marked with the second representation 726 of the unique identifier.

In some embodiments, the product 314 is marked with only a single representation of an identifier that is unique to the product 314.

Product Marking Apparatus

Figure 10:
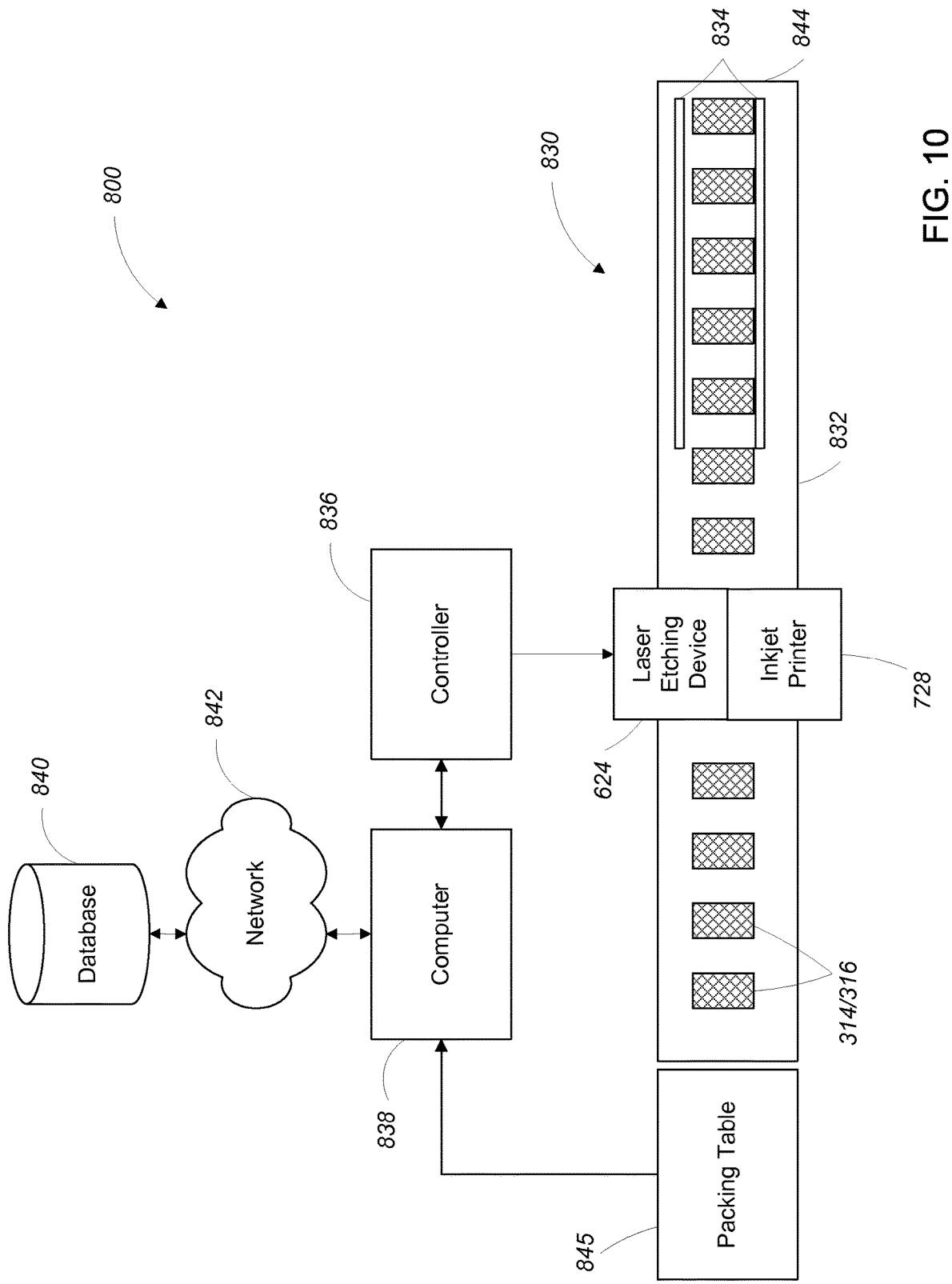
FIG. 10 is a product marking apparatus.

FIG. 10 illustrates one example of a product marking apparatus 800 that includes an assembly line 830 including a conveyor belt 832, a laser engraving device 728, an inkjet printer 624, and one or more alignment bars 834. The laser engraving device 728 and the printer 624 are controlled by a controller 836 that is in communication with (or implemented by) a computer 838 (e.g., a general purpose computing device). The computer 838 is in communication with a database 840 over a network 842 (e.g., a local area internet and/or the internet).

In operation, products 314 or containers 316 including products 314 are placed onto the conveyor belt 832 at a first end 844 of the conveyor belt 832. The conveyor belt 832 moves the containers 316 and/or products 314 in a direction from the first end 844 of the conveyor belt 832 toward a second end 846 of the conveyor belt 832. Before the conveyor belt 832 moves the containers 316 and/or products 314 past the printer 624 and the laser engraving device 728, the alignment bars 834 ensure that the containers 316 and/or products 314 are aligned into a desired position for marking.

As the conveyor belt 832 moves a given container 316 and/or product 314 toward the second end 846 of the conveyor belt 832 the controller 836 monitors a position of the container 316 and/or product 314 (using a sensor, not shown) to determine if the container 316 and/or product 314 is in a first position for printing the first representation 622 of the unique identifier (as provided by the computer 838) onto the container 316 and/or product 314. Once the controller 836 determines that the container 316 and/or product 314 is in the first position, it causes the printer 624 to print the first representation 622 of the unique identifier onto the container 316 and/or product 314.

Similarly, as the conveyor belt 832 moves the given container 316 and/or product 314 toward the second end 846 of the conveyor belt, the controller 836 monitors the position of the container 316 and/or product 314 (using another sensor, not shown) to determine if the container 316 and/or product 314 is in a second position for engraving the second representation 726 of the unique identifier (as provided by the computer 838) onto the product. Once the controller 836 determines that the container 316 and/or product 314 is in the second position, it causes the laser engraving device 729 to engrave the second representation of the unique identifier onto the product 314. In some embodiments, a sensor within the apparatus can read the leading edge of the box and, given that the speed of the conveyor belt is known, the computer can trigger the marking event when the product is appropriately positioned.

In some examples, the first position and the second position are substantially the same and the first and second representations 622, 726 of the unique identifier are marked at substantially the same time. In other examples, the first position and the second position are separated from one another and the controller 836 coordinates the timing of the marking of the first and second representations 622, 726 of the unique identifier.

At the end of the conveyor belt 832, the marked containers 316 and/or products 314 are packed for delivery at a packing table 845. In some examples, upon being packed, the containers 316 and/or products 314 are associated with an invoice number (e.g., by scanning the containers and/or products with a hand-held scanner), which is provided to the computer 838 where it is associated with the unique identifier(s) printed on the containers 316 and/or products 314. The computer 838 stores this association of an invoice number with one or more unique identifiers in the database 840 via the network 842. The associations can be made with the aid of a hand-held scanner.

Unique Identifier

In some examples, the native form of the unique identifiers is an alphanumeric string (i.e., the string that is engraved onto the product 316). The alphanumeric string can be transformed into an alternative (e.g., 2D code) representation.

In some embodiments, the unique identifiers are not serial in nature but are instead randomly generated. In some examples, the unique identifiers include a randomized portion and a non-randomized portion. For example, a unique identifier may include a randomly generated portion and non-randomized portion that includes a manufacturer identifier. In some embodiments, a position of the non-randomized portion in the unique identifier is randomized. In some examples, a human-readable representation of the unique identifier includes a string of one or more symbolic characters (e.g., letters from the Chinese alphabet or geometric shapes).

Diversion and Counterfeiting Control

When a customer or a quality/diversion control agent suspects that a product (e.g., a product found at an esthetician's office or on an internet retailer's website) may have been diverted or is a counterfeit product, they can read the unique identifier from the product and use it to query the database. In some examples, the agent enters (e.g., manually or by an automated scanning process) the human-readable unique identifier into a computer application (e.g., a mobile application, a web application, or a stand-alone personal computer application) which is configured to query the database to determine whether the unique identifier is associated with an authentic but diverted or counterfeited product. In the case of a diverted product, since the database includes an association of the unique identifiers with invoice numbers, the invoice number associated with the unique identifier can be used to trace the product to the last entity in the supply chain to register the product's invoice number. Further investigation can then be performed to determine whether that entity did, in fact, divert the product. If so, the entity can be removed from the distribution channel.

In the embodiments described above, indelible marking is performed using printers and laser engravers. However, any suitable indelible marking technology can be used to indelibly mark products and containers, including but not limited to stamping, embossing, dyeing, and etching.

In any of the embodiments described herein, the product can be a cosmetic product formulated, for example, to cleanse, protect or improve the appearance of the skin, hair, or nails.

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). In general, software features of the above-described embodiments include instructions embodied on non-transitory, computer-readable media (i.e., computer-readable media which does not encompass transitory forms of signal transmission, such as a propagating electrical or electromagnetic signal).

What is claimed is:
1. A method of packaging and indelibly marking a product, the method comprising:
 inserting the product into a container having an opening and a wall including a hole therein;

indelibly marking the product within the container with a first representation of a unique identifier and indelibly marking an outer surface of the container with a second representation of the unique identifier; and securing the product within the container, wherein the product is secured after indelibly marking the product through the opening in the container.

2. The method of claim 1, wherein indelibly marking the product includes one or more of printing, laser engraving, etching, stamping, embossing, and dyeing the first representation of the unique identifier on the product, and indelibly marking the container includes one or more of printing, laser engraving, etching, stamping, embossing, and dyeing the second representation of the unique identifier on the outer surface of the container.

3. The method of claim 1, wherein the first representation of the unique identifier includes a machine-readable code and the second representation of the unique identifier includes a human-readable code.

4. The method of claim 3, wherein the machine-readable code includes a multi-dimensional code and the human-readable code includes a symbolic code.

5. The method of claim 3, wherein the human-readable code includes a randomized portion and a non-randomized portion.

6. The method of claim 4 wherein the symbolic code includes an alphanumeric code.

7. The method of claim 1, further comprising storing an association of an invoice number or other document associated with the product and one or more of the unique identifiers in a database.

8. The method of claim 1 wherein indelibly marking the product within the container includes laser engraving the product with the first representation through the hole in the wall.

9. The method of claim 8 wherein laser engraving the product includes directing a laser through the hole in the wall along an unimpeded path.

10. The method of claim 8 wherein indelibly marking the outer surface of the container includes printing the first representation onto the outer surface of the container using an indelible ink.

11. The method of claim 1 wherein the second representation of the unique identifier includes a randomized, human-readable code associated with information related to the manufacturing of the product.

12. The method of claim 11 wherein the first representation of the unique identifier includes a multi-dimensional code encoding the unique identifier and the information related to the manufacturing of the product.

13. The method of claim 1 further comprising forming the hole in the wall of the container.

14. The method of claim 1 wherein the second representation of the unique identifier includes one or more symbols.

15. An apparatus comprising:
a conveyor belt having a length;
a first marking device configured to indelibly mark a product on the conveyor belt with a first representation of a unique identifier, the first marking device being configured to mark the product through a hole in a wall of the container while the product is within the container;
a second marking device configured to indelibly mark an outer surface of a container containing the product on the conveyor belt with a second representation of the unique identifier; and
a controller for causing the first marking device to mark the product when the product reaches a first position along the length of the conveyor belt and the second marking device to mark the outer surface of the container when the container reaches a second position along the length of the conveyor belt, separated from the first position.

16. The apparatus of claim 15, wherein the first marking device includes one of a printing device, an etching device, a stamping device, an embossing device, a dyeing device, and a laser engraving device and the second marking device includes one of a printing device, an etching device, a stamping device, an embossing device, a dyeing device, and a laser engraving device.

17. The apparatus of claim 16 wherein the first marking device includes a printing device for printing the first representation onto the outer surface of the container using an indelible ink and the second marking device includes a laser engraving device for laser engraving the product with the first representation through the hole in the wall.

18. The apparatus of claim 15, further comprising a computing device in communication with a database, wherein the computing device is configured to store an association between the unique identifier and an invoice number or other document number associated with the product in the database.

19. The apparatus of claim 15, further comprising a first sensor for detecting when the product has reached the first position along the length of the conveyor belt and a second sensor for detecting when the container has reached a first the second position along the length of the conveyor belt.

20. The apparatus of claim 15, wherein the first representation of the unique identifier includes a machine-readable code.

21. The apparatus of claim 20, wherein the second representation of the unique identifier includes a human-readable code.

22. The apparatus of claim 20, wherein the machine-readable code includes a multi-dimensional code and the human-readable code includes a symbolic code.

23. A method of packaging and indelibly marking a product, the method comprising:
inserting the product into a container having an opening and a wall including a hole therein;
indelibly marking the product within the container with a first representation of a unique identifier and indelibly marking an outer surface of the container with a second representation of the unique identifier; and
securing the product within the container, wherein the product is secured before indelibly marking the product by directing the first representation through the hole in the wall of the container.

* * * * *